Patented Apr. 2, 1929.

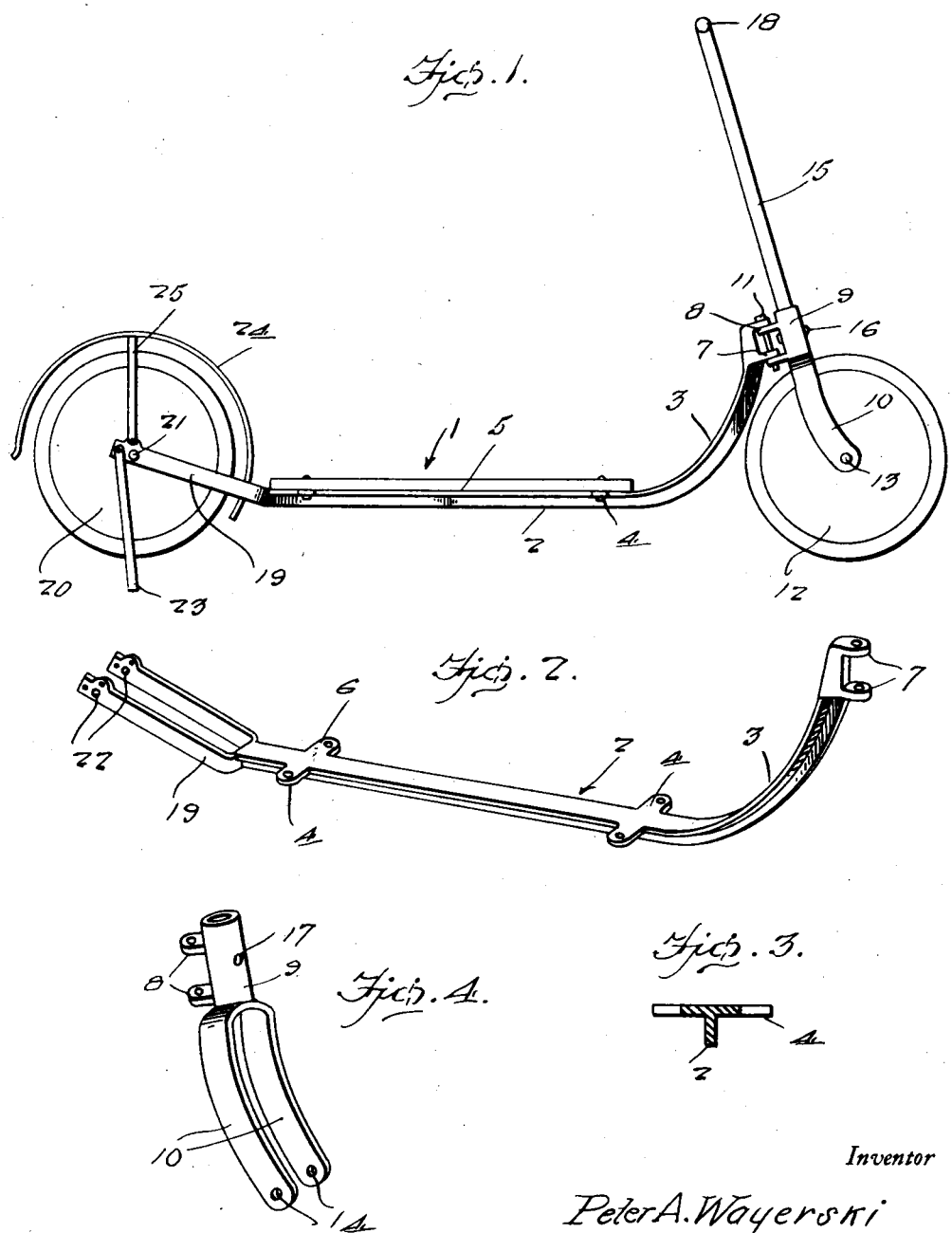

1,707,831

UNITED STATES PATENT OFFICE.

PETER A. WAYERSKI, OF PULASKI, WISCONSIN.

SCOOTER.

Application filed April 7, 1927. Serial No. 181,846.

The present invention relates to improvements in land vehicles and is more particularly adapted to a scooter.

One of the important objects of the present invention is to provide a scooter of the above mentioned character, which consists of a minimum number of parts, thereby rendering the same simple in construction and inexpensive in its manufacture, yet being strong and durable.

Another important object of the invention is to provide a scooter of the above mentioned character, which may be readily assembled or disassembled, without the loss of any considerable length of time or labor.

Other objects and advantages of the invention will become apparent during the course of the following detailed description.

In the accompanying drawing, forming a part of this application, and in which like reference characters designate like parts throughout the views:

Figure 1 is a side elevation of the scooter embodying my invention.

Figure 2 is a perspective view of the cast iron bar or frame.

Figure 3 is a transverse section through the bar, and

Figure 4 is a detail perspective view of the front fork and the steering post receiving socket associated therewith.

In the drawing, wherein for the purpose of illustration is shown the preferred embodiment of my invention, the numeral 1 designates generally my improved scooter, the same comprising a frame or elongated bar, which is cast or molded from a single piece of metal and this bar is designated generally by the numeral 2. This bar is substantially T-shaped in cross section, as is more clearly disclosed in Figure 3, and the forward end thereof is curved upwardly as indicated at 3. Laterally extending ears 4 extend from the side edges of the top portion of the bar and the upper faces of these lugs or ears are flush with the upper face of the horizontal portion of the bar to provide a means for supporting on the bar the running board 5. The ears or lugs 4 are formed with suitable openings 6, to accommodate any appropriate fastening means provided for securing the running board rigidly on the horizontal portion of the bar and as is clearly shown in Figure 1, the running board extends along the major portion of the bar.

A yoke 7 is formed on the upper end of the forwardly curved end 3 of the bar 2 and cooperating with this yoke is a similar yoke 8 formed on the rear side of the socket member 9, the latter being formed on the closed upper end of the front fork 10 and the construction of the front fork is more clearly shown in Figure 4.

A pivot pin 11 extends through registering openings provided therefor in the cooperating yokes 7 and 8, whereby the front fork is pivotally associated with the forward end of the bar. The front wheel 12 is adapted for rotation between the depending arms of the fork 10 and the front axle 13 is journaled through suitable registering openings 14 provided therefor, in the lower ends of the arms of the front fork.

A vertically extending steering column or post 15 is secured at its lower end in the tubular socket 9 and a set screw or the like, shown at 16, extends through a suitable opening 17 formed therefor in the front side of the socket member and the inner end of this set screw engages the lower end of the post or column which is disposed within the column for securing the same in a rigid manner. A handle bar 18 is associated with the upper end of the steering post or column 15.

The bar 2 is formed at its rear end with a slightly upwardly inclined rearwardly extending rear fork 19, and the rear wheel 20 which is supported on the axle 21 is disposed between the arms of the rear fork, and the axle is received in the registering openings 22, formed therefor in the outer ends of the arms of the fork 19.

A stand 23 of any preferred construction is pivotally associated with the outer ends of the arms of the rear fork 19 and in Figure 1, the same is shown as being disposed in a downwardly swung position for supporting the scooter when not in use. It is obvious that when the scooter is to be used, the stand 23 is swung upwardly out of engagement with the ground.

A fender 24 is supported over the rear wheel 20 by the bracket 25 on each side of the wheel in a manner also well known in the art.

The provision of a scooter of the above character, wherein the same consists of a minimum number of parts will permit the vehicle to be manufactured at a very low cost and may furthermore be readily and easily assembled. Furthermore, the scooter will at all times be strong and durable and as the running board is disposed below the center of the wheels, a child can easily operate the scooter.

While I have shown the preferred embodiment of my invention, it is to be understood that various changes in the size, shape and arrangement of parts, may be resorted to, without departing from the spirit of the invention or the scope of the appended claim.

What I claim is:

In a scooter of the class described, an elongated one piece metallic bar of substantially T-shaped design in cross section, the forward end of said bar being curved upwardly, lugs extending laterally from the opposite side edges of the horizontal portion of said T-shaped bar inwardly of the ends thereof, the upper faces of the lugs lying substantially flush with the upper face of the horizontal portion of said T-shaped bar, a running board secured on the intermediate portion of the upper face of said T-shaped bar and said lugs, a fork formed on the rear end of the bar and disposed slightly upwardly in a rearward direction, a socket member, a front fork depending from the socket member, a pivotal connection between the socket member and the upper end of the curved forward end of said bar, a steering wheel mounted in said front fork, a steering column secured at its lower end in the socket, and a rear wheel supported in the rear fork, the running board being disposed below the center of the wheels.

In testimony whereof I affix my signature.

PETER A. WAYERSKI.